US005546328A

United States Patent [19]
Kiridena et al.

[11] Patent Number: 5,546,328
[45] Date of Patent: Aug. 13, 1996

[54] METHOD AND SYSTEM FOR AUTOMATED ALIGNMENT OF FREE-FORM GEOMETRIES

[75] Inventors: Vijitha S. Kiridena, Inkster; Samuel E. Ebenstein, Southfield; Gregory H. Smith, Ann Arbor, all of Mich.

[73] Assignee: Ford Motor Company, Dearborn, Mich.

[21] Appl. No.: 421,725

[22] Filed: Apr. 13, 1995

Related U.S. Application Data

[63] Continuation-in-part of Ser. No. 252,813, Jun. 2, 1994, Pat. No. 5,442,572.

[51] Int. Cl.$^6$ ............................................. G06K 9/32
[52] U.S. Cl. .................... 364/552; 364/554; 364/514 A; 364/474.354; 364/474.364; 382/141; 382/151
[58] Field of Search .................. 364/469, 474.28, 364/474.34, 474.35, 474.36, 514 A, 525, 552, 554, 560–563, 581; 382/141, 144, 145, 147, 151

[56] References Cited

U.S. PATENT DOCUMENTS

| Re. 33,973 | 6/1992 | Krin et al. | 358/244 |
|---|---|---|---|
| 3,911,257 | 10/1975 | Whitehouse et al. | 235/151.3 |
| 4,038,536 | 7/1977 | Feintuch | 235/152 |
| 4,117,538 | 9/1978 | Shrader et al. | 364/517 |
| 4,591,985 | 5/1986 | Tsuji | 364/424 |
| 4,654,808 | 3/1987 | Potter et al. | 364/553 |
| 4,654,809 | 3/1987 | Adcock | 364/553 |
| 4,658,367 | 4/1987 | Potter | 364/553 |
| 4,990,302 | 2/1991 | Oda et al. | 376/216 |
| 5,048,094 | 9/1991 | Aoyama et al. | 382/8 |
| 5,056,052 | 10/1991 | Wick et al. | 364/572 |
| 5,065,334 | 11/1991 | Taylor et al. | 364/485 |
| 5,136,242 | 8/1992 | Abraham-Fuchs | 324/244 |
| 5,270,560 | 12/1993 | Cheng | 250/561 |
| 5,353,356 | 10/1994 | Waugh et al. | 382/8 |
| 5,442,572 | 8/1995 | Kirdena et al. | 364/560 |

*Primary Examiner*—Emanuel T. Voeltz
*Assistant Examiner*—Craig Steven Miller
*Attorney, Agent, or Firm*—Joseph W. Malleck; Roger L. May

[57] ABSTRACT

A method and system are disclosed for the automated alignment of free-form geometries. The method includes the steps of providing a computer work station, a first HDPDM describing the first geometry, and a second HDPDM describing the second geometry. The two geometries must be in crude alignment with one another within a coordinate frame. Next, a plurality of normal distances are computed from the first geometry to the second geometry. The normal distances are used to derive a weighted-fit objective function. A step size is then determined, and the step size is used in the following step of iteratively translating the second HDPDM until the objective function is maximized. The steps of determining a step size and iteratively translating the second HDPDM are repeated until the step size is less than or equal to a desired alignment resolution. The disclosed system includes the means for turning out the steps of the disclosed method.

13 Claims, 9 Drawing Sheets

Fig. 1a

MASTER PART SURFACE

Fig. 1b

PHYSICAL PART SURFACE

Fig. 1c

LEAST SQUARES ALIGNMENT OF SURFACES

Fig. 1d

WEIGHTED FIT ALIGNMENT OF SURFACES

METHOD AND SYSTEM FOR AUTOMATED ALIGNMENT OF FREE-FORM GEOMETRIES

CROSS-REFERENCE TO RELATED APPLICATIONS

This application is a continuation-in-part of U.S. application Ser. No. 08/252,813, filed Jun. 2, 1994, now U.S. Pat. No. 5,442,572.

TECHNICAL FIELD

This invention relates generally to methods and systems for aligning free-form geometries. In particular, this invention relates to a computerized method and system for automatically aligning two free-form geometries using a weighted-fit objective function.

BACKGROUND ART

Recently, manufacturing designs have increasingly incorporated parts having free-form or complex geometries. Although parts having such geometries often replace parts having simpler geometries, there is still a need to verify the accuracy of parts having complex geometries for both fit and function.

Although evaluating the accuracy of manufactured parts having complex geometries is more difficult than inspection of their prismatic predecessors, the method of U.S. application Ser. No. 08/252,813, filed Jun. 2, 1994, now U.S. Pat. No. 5,442,572, provides an efficient and accurate method for verifying conformance of a manufactured part to its design specifications.

The method generates a color coded error map of the localized differences along the local surface normal of the master, or in any specified direction, between a part being inspected and the master by using high density point data modeling (HDPDM) techniques. Such error maps allows the user to evaluate the quality of free-form parts and diagnose the manufacturing deficiencies quickly and accurately. The method is capable of comparing two distinct physical parts, two math/cad models, or a physical part and a cad model.

The technology may also be applied to determine how well two mating parts fit when they are brought together such as stamping or molding dies. Unfortunately, the accurate alignment of two parts, which is necessary for proper comparison, is often difficult to achieve.

The task of accurately aligning data representing two parts presents a problem for virtually every computerized comparison method. A typical mathematical approach to the alignment problem incorporates a least squares analysis. This approach has not been effective in many situations.

DISCLOSURE OF THE INVENTION

A need exists for an efficient and accurate alignment method for comparing two free-form geometries.

It is an object of the present invention to provide a method and system for automatically aligning two free-form geometries using a weighted-fit analysis.

In carrying out the above object and other objects of the present invention, a method is provided for automatically aligning two free-form geometries. The method begins with the step of providing: a computer work station, a first HDPDM describing the first geometry and a second HDPDM describing the second geometry. The first HDPDM must be in crude alignment with the second HDPDM within a coordinate frame.

The method further includes the step of computing a plurality of normal distances from the first geometry to the second geometry. The plurality of normal distances is used to derive a weighted-fit objective function.

The method next includes the step of determining a step size. The step size is used in the following step of iteratively translating the second HDPDM until the objective function is maximized.

The method steps of determining a step size and iteratively translating the second HDPDM to maximize the objective function are repeated until the step size is less than or equal to a desired alignment resolution.

In further carrying out the above object and other objects of the present invention, a system is also provided for carrying out the steps of the above described method.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein.

BEST MODES FOR CARRYING OUT THE INVENTION

Figure 1A:
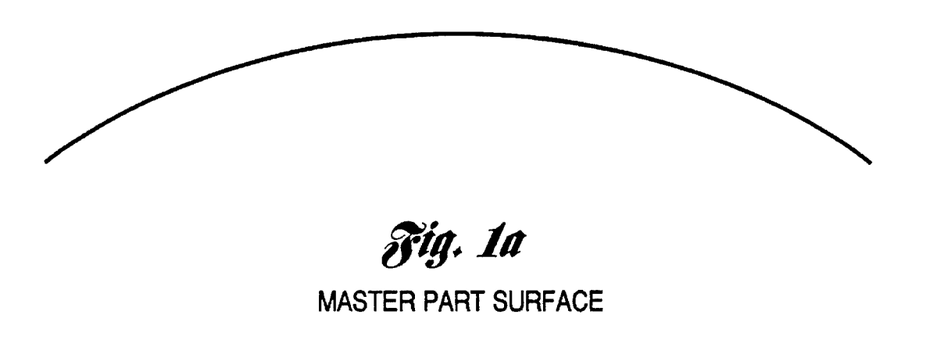
FIGS. 1a–1d are graphs illustrating the results of alignment techniques.
Figure 1B:
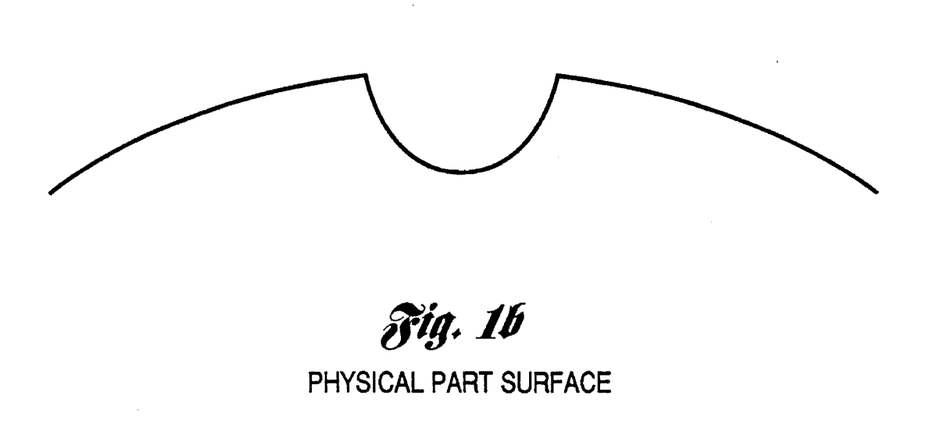

Referring now to the drawings, FIG. 1a is a graph of a two-dimensional curve representing the surface of a master part. FIG. 1b is a graph of a two-dimensional curve representing the surface of a manufactured part.

Figure 1C:
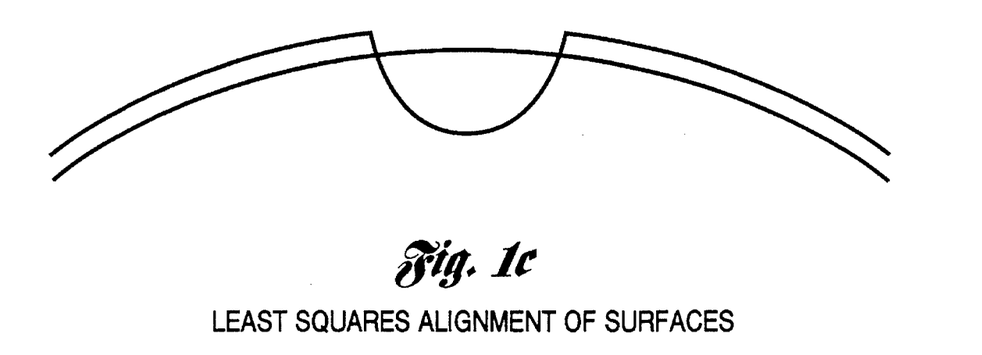

FIG. 1c illustrates the alignment of the master part and the manufactured part using least squares techniques. Least squares techniques assume that each data point is given the same weight. As illustrated, with the exception of the depression of the manufactured part, the surfaces of the master part and the manufactured part are very similar.

A least-squares alignment of the two curves, however does not result in a close alignment of the similar portions of the two surfaces. Least-squares analyses attempt to minimize the sum of the squares of the deviations between the two curves. As a result, the depression of the manufactured part surface will cause that surface to be "pulled" up. In FIG. 1c, the two surfaces are basically distinct.

Figure 1D:
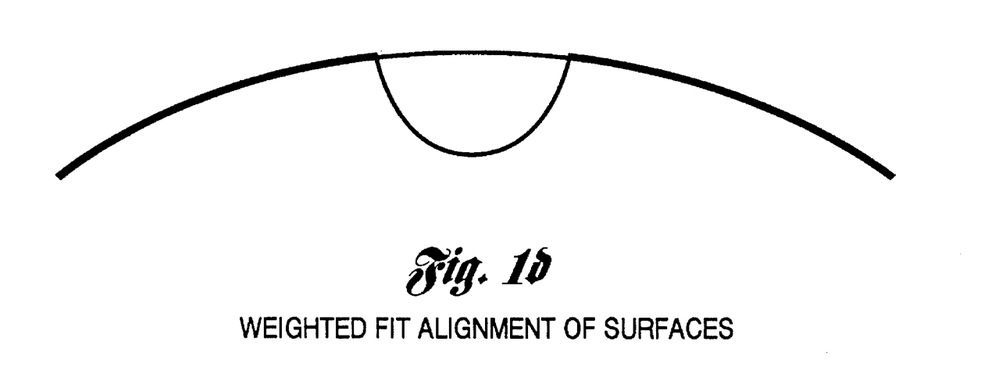

FIG. 1d shows the alignment achieved using the weighted-fit technique of the present invention. The weighted-fit technique of the present invention uses a mathematical procedure to maximize an objective function which describes the closeness of fit between the two geometries.

This function inversely weighs the points in the manufactured part based on their normal distances to the master part. Therefore, closer points are assigned a greater weight than farther points. Points which are beyond some predetermined threshold value can be assigned no weight at all.

These large errors may be considered intentional deviations. FIG. 1d illustrates the result of using the weighted-fit technique to align the surfaces of the master part and the manufactured part. Optimum alignment is considered obtained when the objective function is maximized.

The method of the present invention has been implemented using a programmed HP735-125 work station having 144 MB of RAM. The control logic of the present invention was programmed in ANSI C.

Using the preferred embodiment on engine combustion chamber data and head lamp reflector data, the method has been shown to produce two orders of magnitude improvement in alignment. For example, if a crude alignment is obtained to within 500 microns in x, y, and z, the present method will produce the best alignment to within 1–2 microns. This is sufficient for most comparison purposes.

Figure 2:
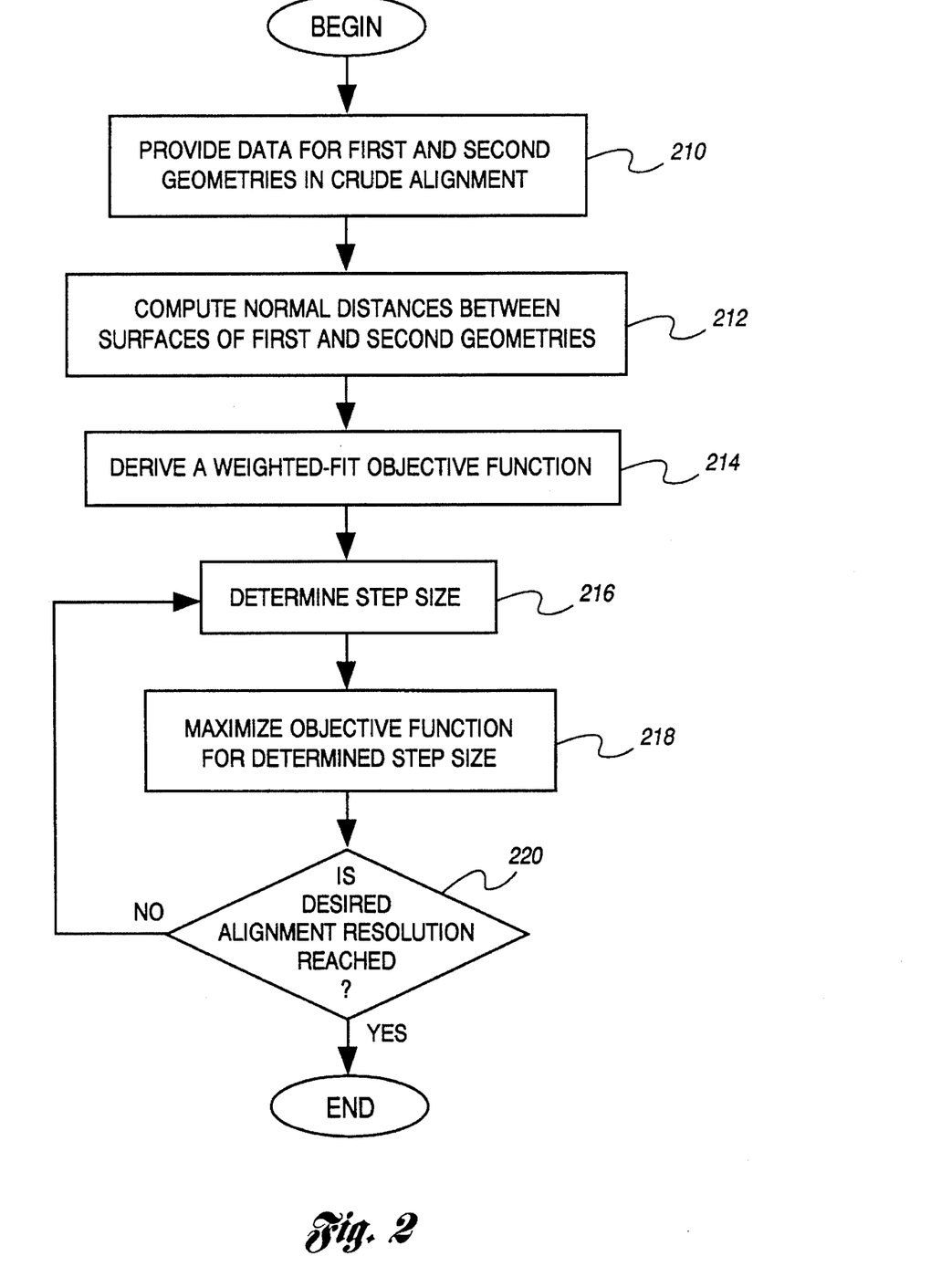
FIG. 2 is a flow diagram illustrating the method steps of the present invention.

Referring now to FIG. 2, there is shown a flow diagram illustrating the steps of the present invention. As shown by block 210, in order to utilize the method of the present invention, the subject geometries must be initially placed in crude alignment. Visual alignment is generally sufficient for such crude alignment. A crude alignment may be obtained from a part setup or from a manual procedure such as checking part cross-sections.

Block 212 shows the next step of the method which is computing the normal distances of the master part to the physical part. Although every data point on the master could theoretically be used, the preferred embodiment uses a small subset of points from the master part HDPDM in the initial stage. Using such a subset improves computational efficiency.

Next, as shown by block 214, an objective function is calculated from these computed distances. The objective function is obtained by summing weights $w_i$ applied to the number of the normal distances of $d_i$ within assigned ranges. The objective function is defined in such a way that small distances $d_i$ provide large weights $w_i$, and large distances provide small weights or even 0.

The objective function depends upon binning the values $d_i$ where each bin has a chosen width, and a chosen weighting factor assigned to each bin. For example, consider the objective function F having 4 bins. Each bin has a width of 25 microns, and the bins are weighted quadratically. $w_i$, the weight to be assigned to the distance $d_i$, can be calculated as follows ($0 \leq d_i \leq 25$) then $w_i=16$
($25 < d_i \leq 50$) then $w_i=9$
($50 < d_i \leq 75$) then $w_i=4$
($75 < d_i \leq 100$) then $w_i=1$
  otherwise $w_i=0$
The objective function of F is obtained as follows $$F = \Sigma w_i(d_i) \quad (1)$$

After deriving an objective function, a step size is determined which is related to the original crude alignment. This is shown by block 216. A number of factors should be considered in determining an appropriate step size. These factors include: the size of the data; the geometry of the part; the original scan density; and the required accuracy/resolution.

If the step size is too small, computation time will be large. If the step size is too large, the selection may not result in an improvement in alignment. Using the preferred embodiment to align head lamp reflectors, it was determined that an original step size of 100 microns works well if the original alignment is good to 500 microns.

Block 218 shows that once a step size has been determined, the method requires iterative translations to maximize the objective function F. The initial value for F is obtained from the normal distances. Subsequent values of F are based on translations of the second geometry.

In the preferred embodiment, a search for a higher value of F includes translating in the x direction, translating in the y direction and then translating in the z direction. Only the search in the x direction will be described in detail since searching in the other two directions are similar.

First, the data describing the second geometry, typically physical part, is translated by the step size in the positive x direction, and a new value for the objective function $F_{new}$ is computed. If $F_{new} > F$ then the data is further translated by the step size.

This translation process is continued until the objective function first decreases, and the previous value of the objective function becomes the new initial value. If the initial translation in the positive x direction produces a lower value $F_{new}$, then x is translated in the negative direction, but the basic translation process is the same.

This translation process is then repeated for the y and z directions. Improvements in alignment in the x, y or z directions typically result in further room for improvement in the other directions. Therefore, alignment along axis for which the objective function was previously maximized should be rechecked after alignment is completed for each new axis. This process continues until all of the x, y and z translations produce no improvement in the objective function.

As shown by block 220, this process is then repeated with a smaller step size until the step size reaches a pre-defined tolerance. For example, 4 iterations with decreasing step size are usually sufficient to go from 100 microns to a final tolerance of 1 micron. As the step size is decreased a greater percentage of master part data should be used to improve accuracy.

Figure 3:
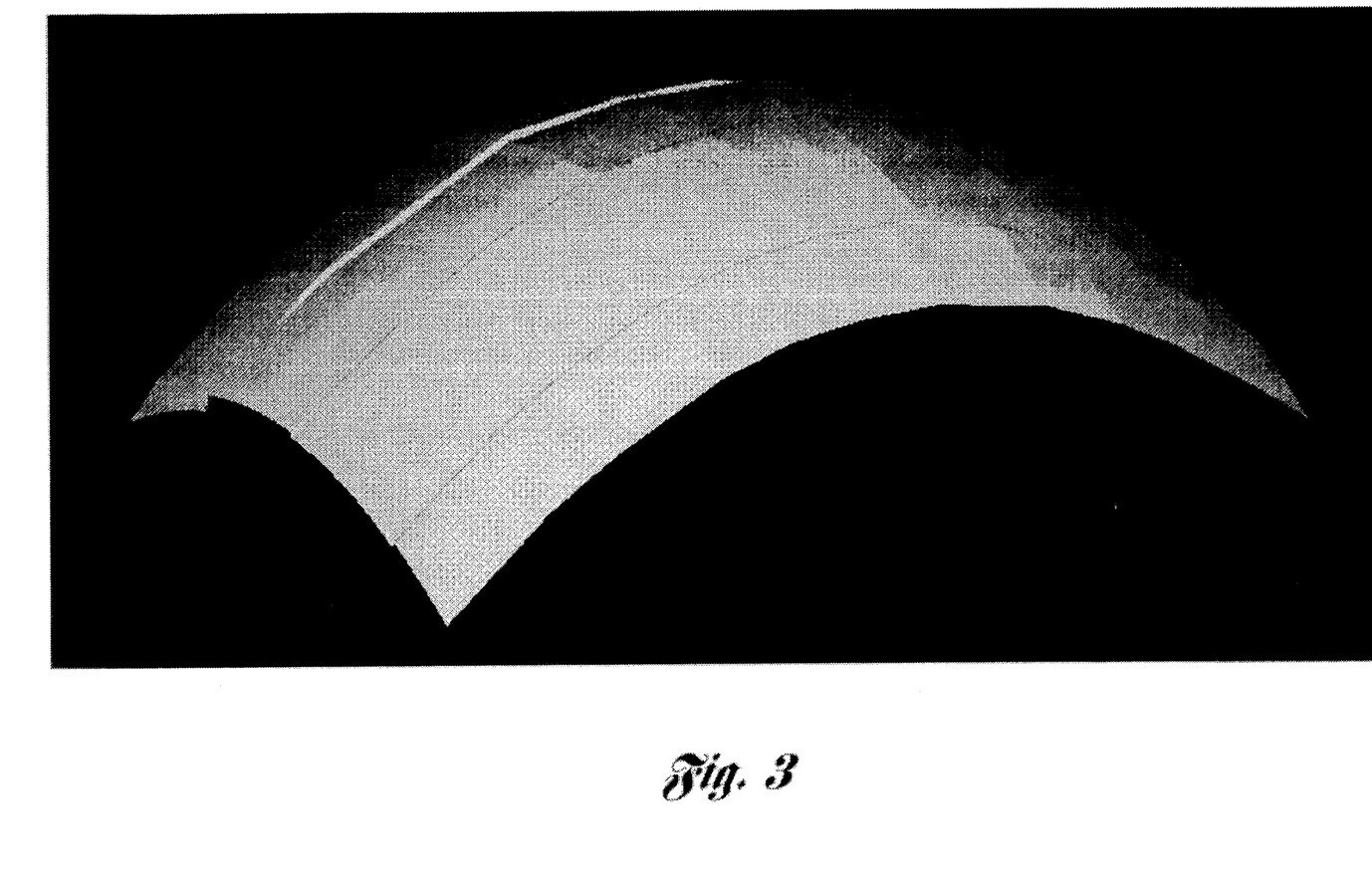
FIG. 3 is a high density point data model for a master head lamp reflector obtained using a math model.

Referring now to FIG. 3, there is shown a representation of a master head lamp reflector having a complex geometry. FIG. 3 was generated based on the HDPDM data from a mathematical model of the head lamp reflector. Although other sources can be used to create the data of the first geometry, this data describes the master head lamp on which FIGS. 5–8 are based.

Figure 4:
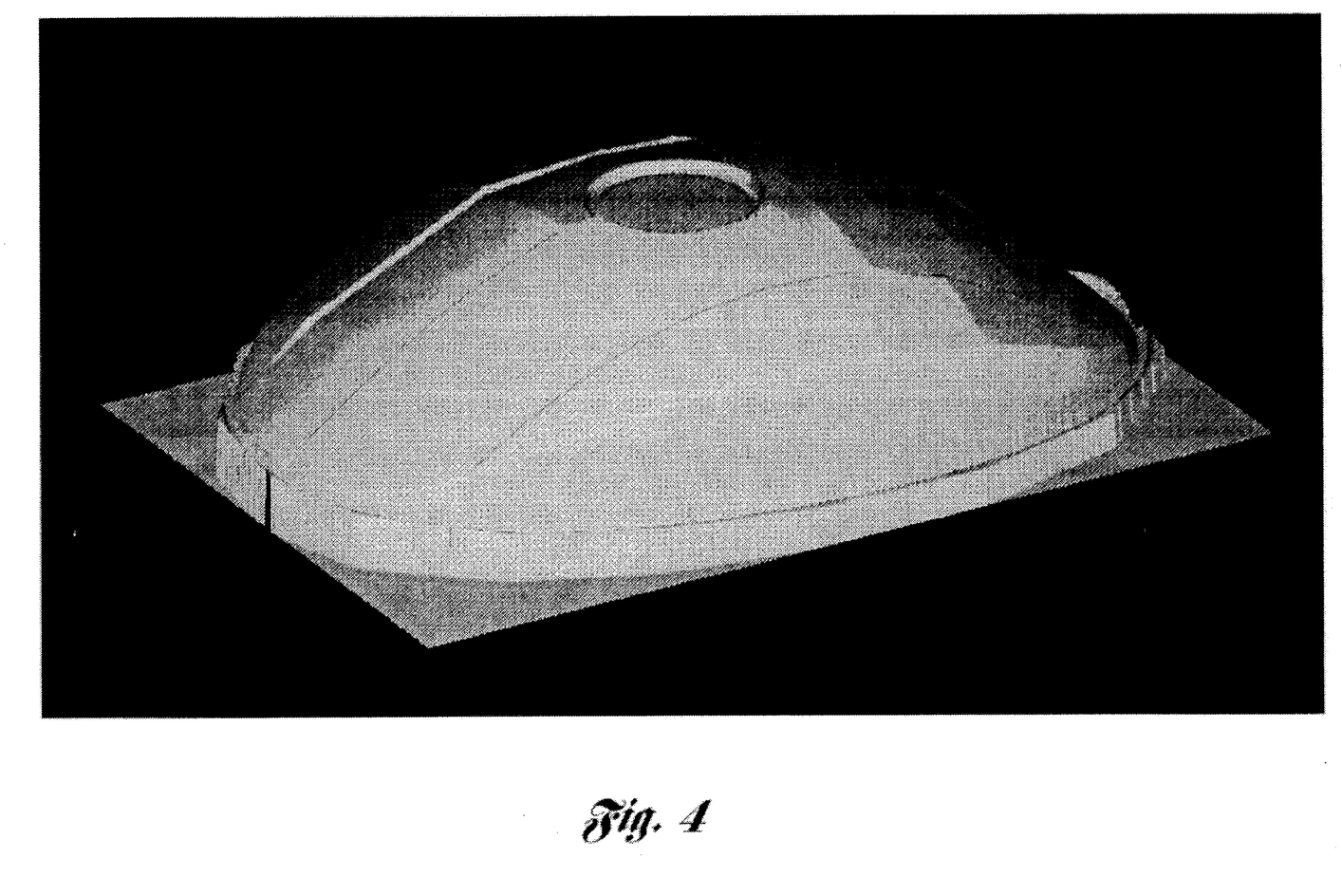
FIG. 4 is a high density point data model for a physical head lamp reflector obtained through laser scanning.

Referring now to FIG. 4, there is shown a representation of a physical head lamp reflector having a complex geometry. FIG. 4 was generated based on HDPDM data from a laser scan of the physical part. The physical part, more specifically a die, is intended to be in substantial conformance to the mathematical model of FIG. 3. In the case of the master head lamp reflector and the physical head lamp reflector, it is necessary to compare the physical part to the mathematical model to determine if the die was manufactured properly.

Figure 5:
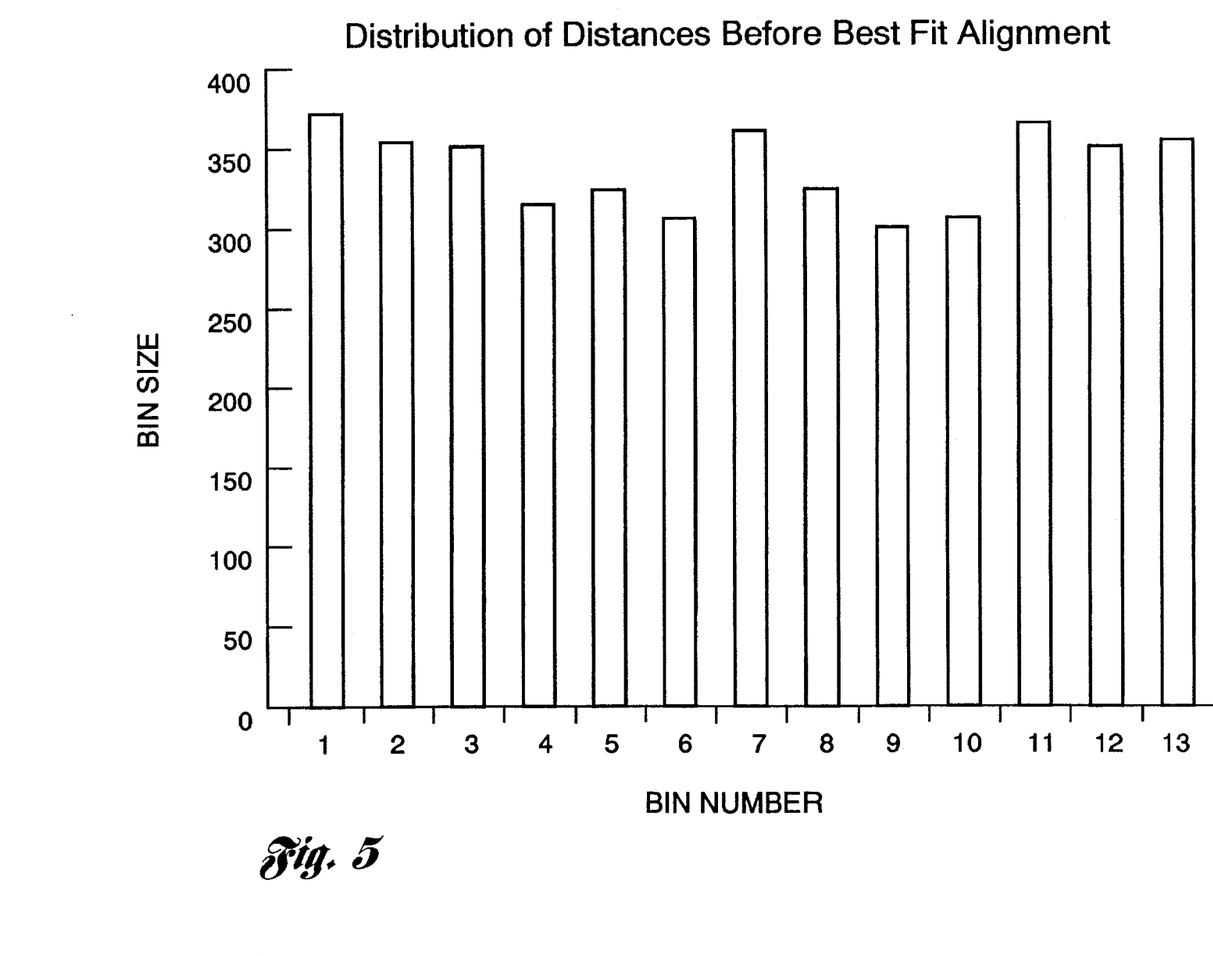
FIG. 5 is a bar graph showing distribution of distances before weighted-fit alignment.
Figure 6:
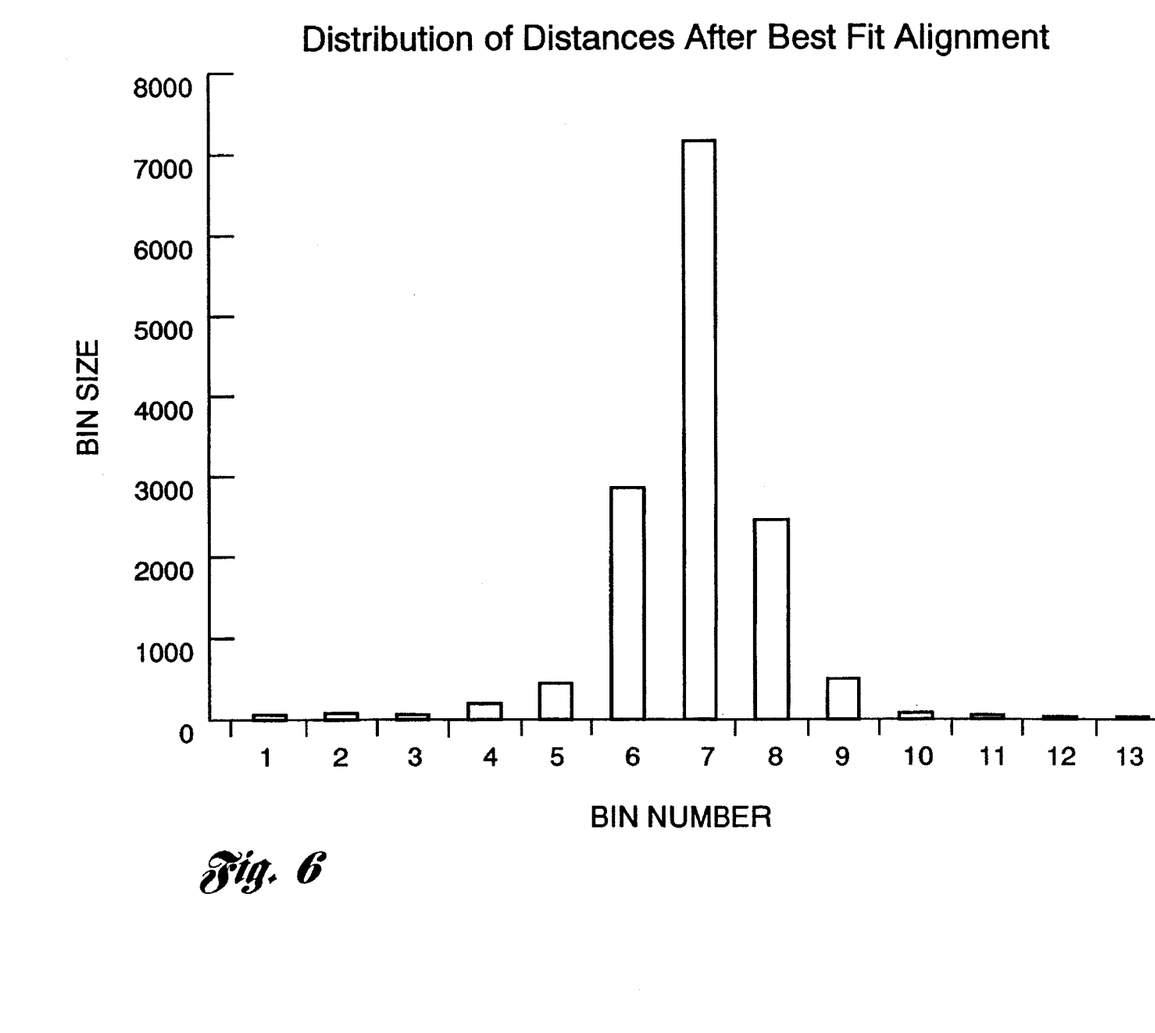
FIG. 6 is a bar graph showing distribution of distances after weighted-fit alignment.

Referring now to FIGS. 5 and 6, there is shown the distribution of the distances between the master part and the physical part before and after automated alignment has been obtained using the weighted-fit technique. In both figures the center bin represents distances very close to 0, and distances greater than a predefined threshold are ignored. FIG. 6 clearly shows that the weighted-fit technique greatly increases the number of points in the physical part which are close to the master part.

Figure 7:
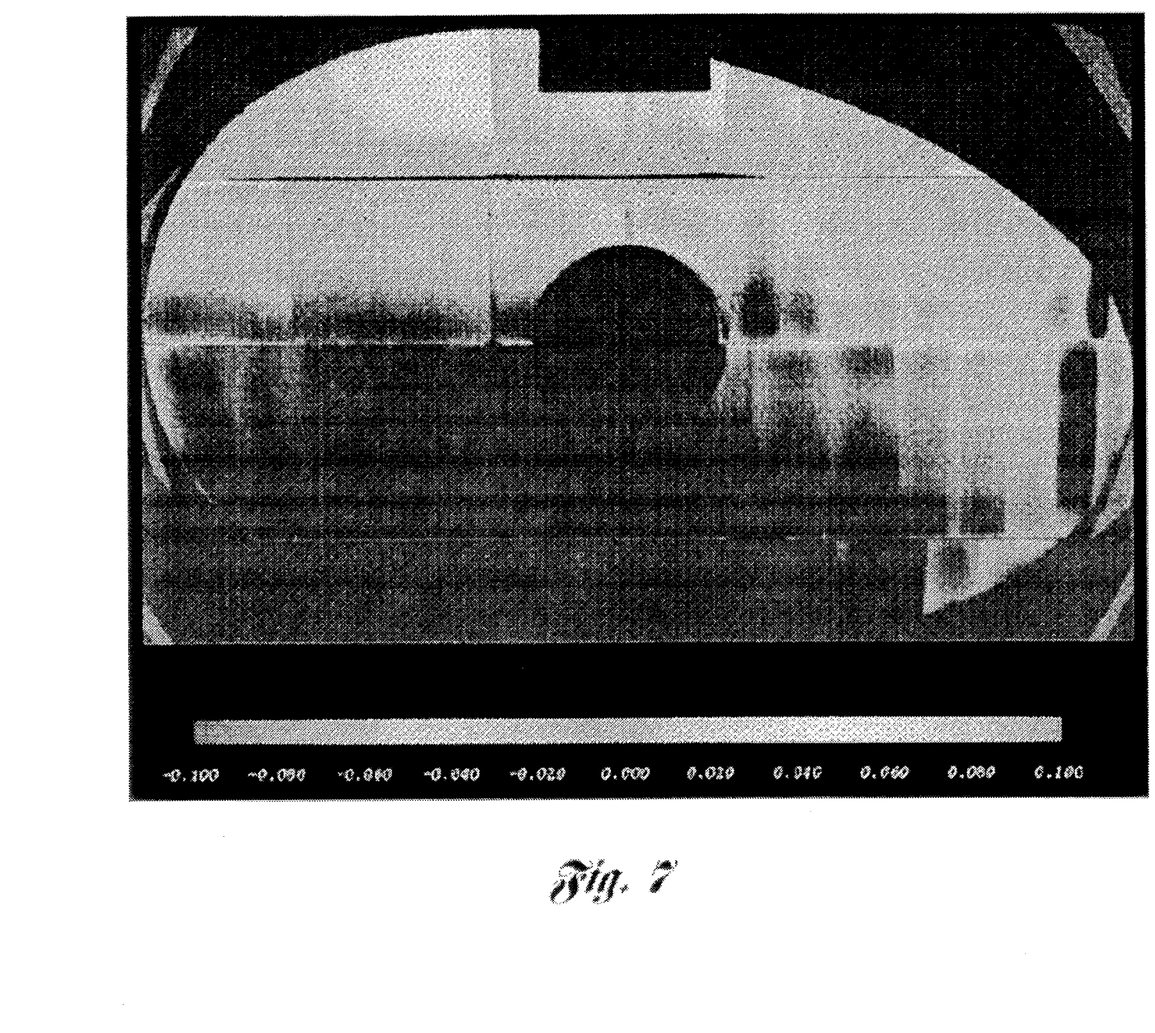
FIG. 7 is an error map of normal distances before automated alignment.
Figure 8:
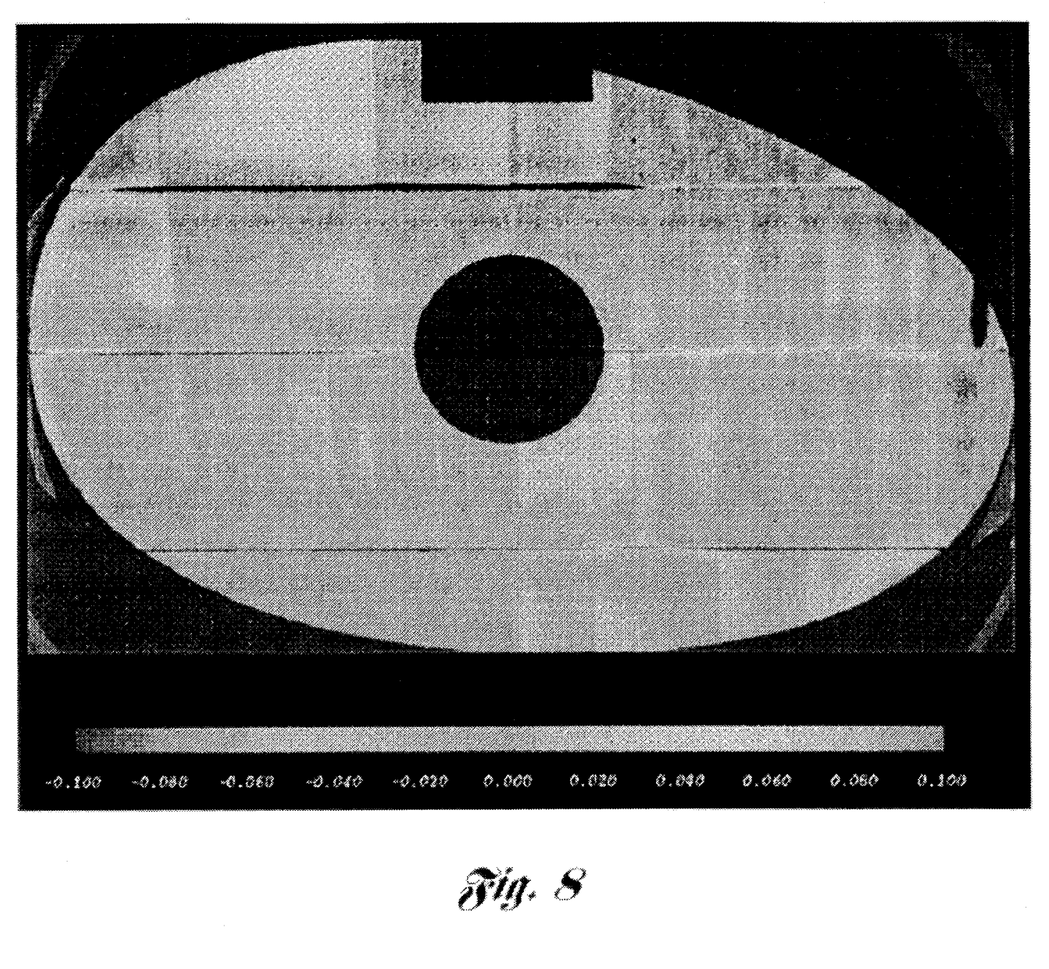
FIG. 8 is an error map of normal distances after automated alignment.

FIGS. 7 and 8 show the color coded error maps of the distances between the two geometries of FIGS. 3 and 4 before and after employing the automated alignment techniques of the present invention. These error maps clearly show the positive effects of the weighted-fit technique.

While the best mode for carrying out the invention has been described in detail, those familiar with the art to which this invention relates will recognize various alternative designs and embodiments for practicing the invention as defined by the following claims.

What is claimed is:

1. A method for automatically aligning a first geometry with respect to a second geometry, the method comprising:
    (a) providing a computer work station;
    (b) providing a first HDPDM describing the first geometry and a second HDPDM describing the second geometry, the first HDPDM being in crude alignment with the second HDPDM within a coordinate frame;
    (c) computing a plurality of normal distances from the first geometry to the second geometry;
    (d) deriving a weighted-fit objective function based on the plurality of normal distances;
    (e) determining a step size;
    (f) iteratively translating the second HDPDM based on the step size until the objective function is maximized; and
    (g) repeating (d)–(f) until the step size is less than or equal to a desired alignment resolution.

2. The method of claim 1 wherein the step of computing a plurality of normal distances is based on a subset of points of the first HDPDM.

3. The method of claim 1 wherein the step of deriving a weighted-fit objective function includes the steps of:
    determining a number of bins;
    assigning a range of distances to each bin;
    assigning a weight to each bin;
    accumulating a number of distances associated with each bin;
    and summing for all bins the number of accumulated distances times the weight.

4. The method of claim 3 wherein the number of bins increases with each iteration of steps (d)–(f).

5. The method of claim 1 wherein the step of determining step size includes the step of:
    determining crude alignment offset; and
    determining the step size as a fraction of the crude alignment offset.

6. The method of claim 1 wherein the step of determining step size includes the step of:
    determining the step size as a fraction of a previous step size.

7. The method of claim 1 wherein the step of iteratively translating includes the sub-steps of:
    (h) determining a first value of the objective function;
    (i) translating the second HDPDM an amount equal to the step size in a predetermined direction along a predetermined axis;
    (j) determining a second value of the objective function;
    (k) comparing the first value to the second value;
    (l) if the second value is greater than the first value, performing sub-steps (h) through (k); and
    (m) translating the second HDPDM an amount equal to the step size in a predetermined opposite direction along the predetermined axis.

8. The method of claim 7 wherein method sub-steps (h) through (m) are performed for three orthogonal axes.

9. A system for automatically aligning a first geometry with respect to a second geometry, the system comprising:
    (a) a computer work station;
    (b) means for providing a first HDPDM describing the first geometry and a second HDPDM describing the second geometry, the first HDPDM being in crude alignment with the second HDPDM within a coordinate frame;
    (c) means for computing a plurality of normal distances from the first geometry to the second geometry;
    (d) means for deriving a weighted-fit objective function based on the plurality of normal distances;
    (e) means for determining a step size;
    (f) means for iteratively translating the second HDPDM based on the step size until the objective function is maximized; and
    (g) means for determining if the step size is less than or equal to a desired alignment resolution.

10. The system of claim 9 further including:
    means for determining a number of bins;
    means for assigning a range of distances to each bin;
    means for assigning a weight to each bin; and
    means for assigning a weight to each range; and
    means for accumulating a number of distances associated with each bin summing for all bins the number of distances times the weight.

11. The system of claim 9 further including:
    means for determining crude alignment offset; and
    means for determining the step size as a fraction of the crude alignment offset.

12. The system of claim 9 further including:
    means for determining the step size as a fraction of a previous step size.

13. The system of claim 9 further including:
    means for determining a first value of the objective function;
    means for translating the second HDPDM an amount equal to the step size in a predetermined direction along a predetermined axis;
    means for determining a second value of the objective function;
    means for comparing the first value to the second value; and
    means for translating the second HDPDM an amount equal to the step size in a predetermined opposite direction along the predetermined axis.

* * * * *